(12) United States Patent
Lang

(10) Patent No.: US 6,382,230 B1
(45) Date of Patent: May 7, 2002

(54) BALL VALVE

(75) Inventor: Brian Lang, Roanoke, VA (US)

(73) Assignee: Acadia Elastomers Corp., Roanoke, VA (US)

( * ) Notice: Subject to any disclaimer, the term of this patent is extended or adjusted under 35 U.S.C. 154(b) by 0 days.

(21) Appl. No.: 09/603,413

(22) Filed: Jun. 26, 2000

(51) Int. Cl.⁷ .......................... F16K 15/04; F16K 27/00
(52) U.S. Cl. .............. 137/15.22; 137/533.11; 137/533.19; 137/540
(58) Field of Search .................. 137/533.11, 535, 137/539, 533.13, 533.15, 540, 519.5, 15.22, 15.19, 533.19, 543.19

(56) References Cited

U.S. PATENT DOCUMENTS

| | | | |
|---|---|---|---|
| 2,723,679 A | * 11/1955 | Harris et al. | ........ 137/543.19 X |
| 2,999,499 A | 9/1961 | Willet | |
| 3,542,155 A | 11/1970 | Kern et al. | |
| 3,672,396 A | 6/1972 | Pauliukonis | |
| 3,693,650 A | 9/1972 | MacGuire | |
| 3,768,509 A | 10/1973 | Goda | |
| 3,854,557 A | 12/1974 | Wilcox | |
| 3,897,803 A | 8/1975 | Stevenson | |
| 4,076,043 A | 2/1978 | Rogan | |
| 4,084,304 A | * 4/1978 | Myers | .................. 137/539 X |
| 4,197,875 A | 4/1980 | Schieferstein et al. | |
| 4,365,648 A | 12/1982 | Grothe | |
| 4,583,925 A | 4/1986 | Hawkins | |
| 4,597,511 A | 7/1986 | Licari | |
| 4,665,940 A | 5/1987 | Jacobson | |
| 4,681,139 A | 7/1987 | Falconer | |
| 4,776,430 A | 10/1988 | Rule | |
| 4,852,605 A | 8/1989 | Gouhier | |
| 6,042,350 A | * 3/2000 | Beck | ................. 137/543.19 X |

* cited by examiner

*Primary Examiner*—Kevin Lee
(74) *Attorney, Agent, or Firm*—Mayer, Brown, Rowe & Maw

(57) ABSTRACT

A ball valve comprising a seat having a first opening thereon, a housing over the seat having a second opening defined by a flap having an inner and outer diameter, and a ball in the housing, the ball having a diameter great than the inner diameter of the flap. The seat may be formed directly onto a metal insert of a bonded piston seal, or directly onto a wall of any chamber needing a ball valve therein. The housing may be formed as an extension of a piece of rubber used to seal the periphery of the insert or chamber wall. Hence, the housing and insert or chamber wall may be molded together as part of a unitarily formed chamber and ball valve combination.

27 Claims, 1 Drawing Sheet

BALL VALVE

BACKGROUND OF THE INVENTION

1. Field of the Invention

The present invention relates generally to a ball valve. Particularly, the present invention is directed to a bonded piston seal ball valve.

2. Description of Related Art

Ball valves of all types for varied uses are well known in the art. Applications tend to utilize ball valves where it is desirable to selectively seal or unseal an opening based upon some physical factors such as, for example, rotation or pressure differences. Accordingly, ball valves are often necessary components to any automotive transmission. In those instances, ball valves are utilized to permit a piston to stroke in response to pressure, thus allowing the piston's clutch pack to be engaged in connection with a gear change.

In operation, pistons in the transmission system engage a particular gear as pressure is applied, and disengage when pressure is relieved. As the pistons of a transmission system rotate, the transmission fluid in the pistons rotates with them and builds up pressure due to centrifugal force. To keep the pressure from building and hence causing different gears to be engaged simultaneously, the pistons are fitted with ball valves designed to allow fluid (and hence pressure) to leak out under certain conditions.

Bonded piston seals are common in transmissions. Bonded piston seals have metal inserts about their perimeter in the piston chamber to create seals. Rubber is often molded over the inner and/or outer ends to maintain a better seal between the insert and the piston shaft and bore, respectively. The ball valve is placed into an opening in the insert. FIG. 3 depicts an embodiment of the prior ball valve designs, with a prior ball valve designated generally as numeral 100. A metal insert 110 of a bonded piston seal is shown. The insert 110 of a bonded piston seal is of a generally circular shape and sits between the piston shaft and the bore. The insert 110 has a rubber seal 130 molded around its inner and outer edges to provide a better seal. The insert 110 also includes an opening 120. A ball valve 100 is then press fit into the opening 120. In other prior art embodiments, the ball valve 100 may be slip fit into the insert 110 and staked for retention, or the ball valve 100 may be press fit into an opening of the piston seal without use of an insert 110.

There are several disadvantages to each of the prior designs. The ball valve 100 exists as a separate component from the insert 110, adding to the cost of manufacture. In addition, care must be taken to ensure that the there is no leakage between the ball valve 100 and the opening 120. Furthermore, performance of the ball valve 100 may be adversely affected if the ball valve 100 is not positioned properly. For example, if the ball valve 100 is cocked slightly to one side, the ball will not seat properly and may seal or leak under improper conditions. Moreover, since each ball valve 100 must be acquired separately, individual performance of piston seals may differ based upon slight variations in dimension, strength, or seat angles in the different ball valves 100.

There thus remains a need for an efficient and economic ball valve that overcomes each of the above disadvantages.

SUMMARY OF THE INVENTION

The purpose and advantages of the present invention will be set forth in and apparent from the description that follows, as well as will be learned by practice of the invention. Additional advantages of the invention will be realized and attained by the methods and systems particularly pointed out in the written description and claims hereof, as well as from the appended drawings.

It is an object of the invention to provide an inexpensive ball valve. A feature of an embodiment of the present invention is a dividing member having a seat thereon. In an embodiment of the present invention, the dividing member may be an insert for a bonded piston seal. In other embodiments, the dividing member can be any structure dividing two or more chambers. Another feature of an embodiment of the present invention is a housing over the seat. In one embodiment, the housing may be molded to the insert. A feature of another embodiment of the present invention is a housing and rubber seal unitarily formed. An advantage of the preferred embodiments of the present invention is that ball valves may be more cheaply produced by incorporating the seat as part of the insert. Another advantage is that it is less expensive to insert a ball into a molded housing than to insert an entire valve assembly into a hole in a wall or dividing member of the desired chamber. Yet another advantage is that it is inexpensive to create the housing as part of the rubber seal.

A further object of the present invention is to provide for more consistent valve performance. A feature of an embodiment of the present invention is a valve seat that is formed directly into a chamber wall, dividing member or insert. An advantage of the preferred embodiment is that the chances for misaligning or cocking the valve during use or installation are greatly reduced.

Yet another object of the present invention is to provide for an improved ball valve and chamber. A feature of an embodiment of the present invention is a chamber having a seat formed directly onto a wall of the chamber. Another feature of an embodiment of the present invention is a housing unitarily formed with a wall of the chamber. An advantage of the preferred embodiments is that the device may be more cheaply produced. Another advantage of the preferred embodiment is that valve performance is improved by ensuring stable and proper alignment of the valve seat with the chamber wall.

In brief, a preferred embodiment includes a ball valve comprising: a seat formed in a dividing member having a first opening thereon; a housing over the seat having a second opening defined by a flap defined by an outer diameter and an inner diameter; and a ball in the housing, the ball having a diameter greater than the inner diameter.

Another embodiment includes a ball valve for a bonded piston seal comprising: a bonded piston seal insert, the insert having a seat with a first opening thereon; a housing over the seat, the housing having a flap at an end thereof, wherein the flap is defined by an outer perimeter and an inner perimeter, the inner perimeter defining a second opening; and a ball in the housing, the ball larger than the second opening.

A further embodiment includes a unitarily formed chamber and ball valve comprising: a seat formed in a wall of the chamber, the seat having a first opening; a housing over the seat, the housing having a flap at an end thereof, wherein the flap is defined by an outer perimeter and an inner perimeter, the inner perimeter defining a second opening; and a ball in the cavity, the ball larger than the second opening.

It is to be understood that both the foregoing general description and the following detailed description are exemplary and are intended to provide further explanation of the invention claimed.

The accompanying drawing, which is incorporated in and constitutes part of this specification, is included to illustrate and provide a further understanding of the method and system of the invention. Together with the description, the drawing serves to explain the principles of the invention.

DETAILED DESCRIPTION OF THE PREFERRED EMBODIMENT

Reference will now be made in detail to the present preferred embodiments of the invention, an example of which is illustrated in the accompanying drawing.

The embodiments of the ball valve presented herein may be used for fluid sealing and leakage control. The present invention is particularly suited for use with a piston wherein the ball valve seals or leaks based upon pressures and rotations to allow, for example, for smoother gear shifts in a vehicle transmission. For purpose of explanation and illustration, and not limitation, an exemplary embodiment of a ball valve in accordance with the invention is described herein with reference to FIG. 1 and FIG. 2.

Figure 1:
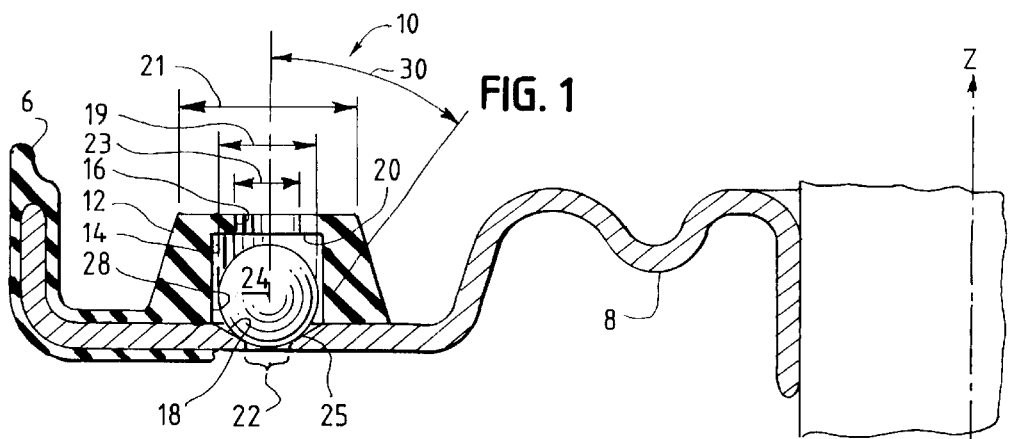
FIG. 1 is a partial cross sectional diagram of a ball valve according to an embodiment of the present invention.
Figure 2:
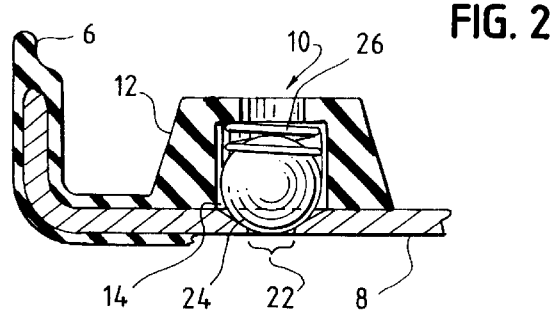
FIG. 2 is a partial cross sectional diagram of a ball valve according to another embodiment of the present invention.
Figure 3:
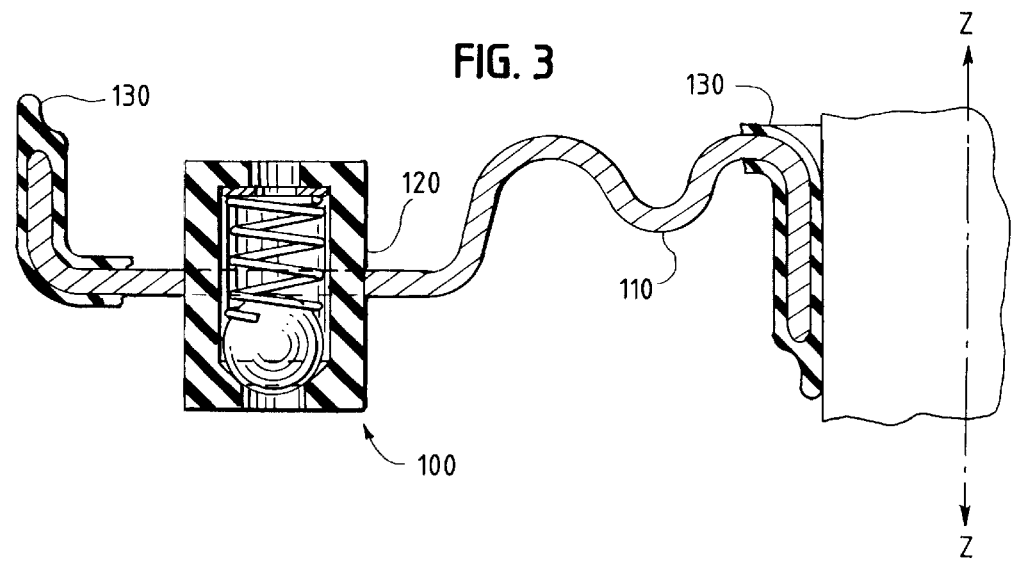
FIG. 3 is a partial cross sectional diagram of a prior art ball valve.

An embodiment of the ball valve, designated generally as numeral 10, is shown in FIG. 1. The ball valve 10 comprises a housing 12 having an interior cavity 14 for housing a ball 24, and an opening 16 defined by a flap 20 defined by an inner diameter 19 and outer diameter 21. The inner and outer diameters 19, 21 may vary so long as the inner diameter 19 is shorter than the diameter 23 of the ball 24. In other embodiments, the flap 20 may define other shaped openings having other inner and outer perimeters, so long as the opening defined by the inner perimeter is small enough to maintain the ball 24 in the cavity 14. The ball valve 10 further comprises a seat 22 with an opening 18 thereon. The housing 12 is preferably generally cylindrical so as to accommodate a ball 24 in the cavity 14, although the shape and design of the housing 12 may take other forms to account for design preferences, different stresses environments or needs. The housing 12 may be of such height so as to limit the distance which the ball 24 may lift up out of the seat 22. In other embodiments, such as in FIG. 2, the ball valve 10 may also include a spring 26 in the interior 14 of the housing 12 for biasing the ball 24 and limiting the opening of the seat 22. It should be apparent, however, that the present invention includes embodiments in which a spring 26 is unnecessary.

Referring again to FIG. 1, in the present embodiments, the seat 22 is formed directly onto a dividing member. The dividing member may be any structure for dividing two or more chambers. In one embodiment of the present invention, the dividing member is an insert 8, such as may be used with a bonded piston seal. In typical automotive use, the insert 8 may be made of steel, aluminum, plastic, other composite materials, or any other material having a sufficient resistance to transmission fluid. The seat 22 is defined by sloped sides 25. In sealing conditions, the ball 24 rests in the seat 22 and seals the opening 18. In leakage conditions, such as would be caused by changes in fluid pressure in the ball valve 10 or centrifugal forces, the ball 24 is lifted out of its seat 22, or may roll up one of the slopes 25, to allow leakage of fluid through the opening 18. In a preferred embodiment, the seat 22 has a shape defined by the contours of a frustum having its base towards the interior of the housing 12. The precise slope of the sides 25 may be manipulated in manufacturing to create a ball valve 10 the seals or leaks according to the desired conditions.

In typical bonded piston seals, the insert 8 has rubber seals 6 molded around its peripheral edges. In the preferred embodiment, the housing 12 is included as an extension of one of the molded rubber seals 6. It will be understood by those skilled in the art that a variety of rubbers may be used, such as, for example, FKM, EA, HNBR, or any other rubber material that resists excessive degradation in transmission fluid. Because the seat 22 is formed directly on the insert 8, and the housing 12 is formed as part of the rubber seal 6, the ball valve 10 of the preferred embodiment may be manufactured and installed at a fraction of the cost of purchasing and installing separate ball valves. Moreover, the preferred embodiment creates an inexpensive and effective unitary piston seal and ball valve. Although the present embodiment is particularly suited for use with bonded piston seals, it should be apparent that the present invention is also directed towards any unitarily formed chamber and ball valve, and all such embodiments are intended to be within the scope of the present invention. For illustrative purposes only, and without limiting the scope of the invention, such other embodiments may include any other embodiment wherein a ball valve or ball check valve may be utilized.

The ball valve 10 is susceptible to several embodiments, including variations in the size and shape of the seat 22. Typically, the seat 22 defines a seat angle 30. The seat angle 30 is defined herein as the angle between contour 25 of the seat 22 and the center line of the seat 22. The seat angle 30 is one of several factors which determine the operating conditions of the ball valve 10. In addition to the seat angle 30, other factors may include, without limitation, the radius at which the ball valve 10 is located from its centerline of rotation, the ball diameter 23, the density of the ball 24, the surface finish of the seat 22, the density of the fluid, and the force of the spring 26, if applicable, on the ball 24.

In a preferred embodiment, the dividing member is steel-stamped to create a seat 22 having a pre-determined seat angle 30. Other method of forming the seat 22 include, but are not limited to machining or molding. The dividing member may also be finished using a hard steel pin to form the seat 22. In the preferred embodiment, the cavity 14 of the housing 12 is wider than the seat 22 to permit the ball 24 to roll up the sides 25 and to permit more fluid between the walls of the cavity 14 and the ball 24.

In the preferred embodiment's operation, fluid, such as transmission fluid in bonded piston seals, flows into the ball valve 10 through opening 16 from the chamber being sealed by the piston. In automotive use, when the ball valve 10 leaks, the fluid flows into a reservoir pan and is recycled into the chamber. However, it should be understood the particular source or destination of the fluid does not affect the scope of the invention. As the piston and insert 8 rotate about the axis z—z, the pressure in the piston builds and causes the piston to stroke, causing the clutch pack to engage a particular gear. If pressure continues to build, the piston will continue to stroke and the piston will continue to engage that particular gear. To prevent gears from being engaged simultaneously and damaging the transmission, the ball valve 10 allows fluid to leak through the opening 18, relieving pressure in the piston chamber. Different pistons and different applications will require different ball valve leakage characteristics, and those characteristics may be manipulated by altering, for example, the seat angle 22, the density of the ball 24, the radius at which the ball valve 10 is located from its centerline of rotation (i.e., z—z), the ball diameter 23, the surface finish of the seat 22, the density of the fluid, and the force of the spring 26, if applicable, on the ball 24.

It will be apparent to those skilled in the art that various modifications and variations can be made in the method and system of the present invention without departing from the spirit or scope of the invention. For example, any chamber wall or dividing member susceptible to rubber molding may employ the ball valve of the present invention. Thus, it is intended that the present invention include modifications and variations that are within the scope of the appended claims and their equivalents.

What is claimed is:

1. A ball valve for a bonded piston seal comprising:
   a bonded piston seal insert, the insert having a seat with a first opening thereon;
   a housing over the seat, the housing having a flap at one end, wherein the flap is defined by an outer perimeter and an inner perimeter, the inner perimeter defining a second opening; and
   a ball in the housing, the ball larger than the second opening.

2. The ball valve according to claim 1 wherein the housing is molded to the insert.

3. The ball valve according to claim 1 wherein the housing is made of rubber.

4. The ball valve according to claim 1 wherein the seat has a shape defined by interior contours of a frustum having its base towards the housing.

5. The ball valve according to claim 1 further comprising a spring in the housing positioned between the ball and the flap.

6. The ball valve according to claim 1 wherein the seat defines a seat angle.

7. A unitarily formed chamber and ball valve comprising:
   a seat formed in a wall of the chamber, the seat having a first opening;
   a housing over the seat, the housing a flap at an end thereof, wherein the flap is defined by an outer perimeter and an inner perimeter, the inner perimeter defining a second opening;
   a ball in the cavity, the ball larger than the second opening; and
   wherein the housing is molded to the chamber wall.

8. The unitarily formed chamber and ball valve according to claim 7 wherein the housing is made of rubber.

9. The unitarily formed chamber and ball valve according to claim 7 wherein the seat has a shape defined by interior contours of a frustum having its base towards the housing.

10. The unitarily formed chamber and ball valve according to claim 7 further comprising a spring in the housing positioned between the ball and the flap.

11. The unitarily formed chamber and ball valve according to claim 7 wherein the seat defines a seat angle.

12. A ball valve comprising:
    a seat formed in an insert for a bonded piston seal having a first opening thereon;
    a housing over the seat having side walls wherein the base of the side walls is proximate the seat;
    a ball in the housing; and
    a means for retaining the ball in the housing.

13. The ball valve according to claim 12 wherein the means for retaining the ball in the housing comprises a flap at the top end of the housing, the flap defined by an outer perimeter and an inner perimeter, the inner perimeter defining a second opening smaller than the ball.

14. The ball valve according to claim 12 further comprising a means for biasing the ball in a seated position.

15. The ball valve according to claim 14 wherein the means for biasing the ball in a seated position comprises a spring between the flap and the seat.

16. A method for creating a ball valve comprising the steps of:
    forming a seat in a dividing member;
    placing a ball over the seat;
    placing a housing over the seat and ball, the housing comprising a flap at an end thereof, wherein the flap is defined by an outer perimeter and an inner perimeter, the inner perimeter defining a second opening smaller than the ball; and
    bonding the housing to the dividing member.

17. The method as recited in claim 16 further comprising the step of placing a spring in the housing between the ball and the flap.

18. The method as recited in claim 16 wherein the housing is made of rubber.

19. The method as recited in claim 16 wherein the dividing member is an insert for a bonded piston seal.

20. The method as recited in claim 16 wherein the step for forming a seat in a dividing member comprises steel-stamping the dividing member.

21. The method as recited in claim 16 wherein the step for forming a seat in a dividing member comprises finishing the dividing member with a hard steel pin to form the seat.

22. The method as recited in claim 16 wherein the step for forming a seat in a dividing member comprises machining the seat into the dividing member.

23. The method as recited in claim 16 wherein the step for forming a seat in a dividing member comprises molding the seat into the dividing member.

24. A bonded piston seal insert comprising:
    a ball valve comprising
       a seat with a first opening thereon formed in the insert;
       a housing over the seat, the housing having a flap at one end, wherein the flap is defined by an outer perimeter and an inner perimeter, the inner perimeter defining a second opening; and
       a ball in the housing, the ball larger than the second opening;
       wherein the housing of the ball valve is molded to the insert.

25. The bonded piston seal according to claim 24 wherein the housing is made of rubber.

26. The bonded piston seal according to claim 24 wherein the seat has a shape defined by interior contours of a frustum having its base towards the housing.

27. The bonded piston seal according to claim 24 further comprising a spring in the housing positioned between the ball and the flap.

* * * * *